United States Patent
Eloian et al.

(10) Patent No.: US 6,957,849 B2
(45) Date of Patent: Oct. 25, 2005

(54) WINDSHIELD STOP FOR COWL VENT GRILLE ATTACHMENT

(75) Inventors: Yasmin Eloian, Dearborn, MI (US); Yehia Harajli, Dearborn Heights, MI (US); Tanya C. Sakhleh, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/751,273

(22) Filed: Jan. 2, 2004

(65) Prior Publication Data

US 2005/0146155 A1 Jul. 7, 2005

(51) Int. Cl.[7] .................................................. B60J 1/00
(52) U.S. Cl. ......................................... 296/201; 296/192
(58) Field of Search ............................... 296/192, 201, 296/146.15, 146.1

(56) References Cited

U.S. PATENT DOCUMENTS

| | | | | |
|---|---|---|---|---|
| 4,304,075 A | | 12/1981 | Miyoshi | 52/98 |
| 4,521,050 A | * | 6/1985 | Rea et al. | 296/192 |
| 4,679,845 A | | 7/1987 | Detampel | 296/192 |
| 4,758,039 A | | 7/1988 | Ohhazama | 296/84 |
| 5,308,135 A | * | 5/1994 | Stedman | 296/201 |
| 5,310,240 A | * | 5/1994 | Andre et al. | 296/201 |
| 5,522,636 A | | 6/1996 | Kolar, Jr. | 296/146.15 |
| 5,692,953 A | | 12/1997 | Bell | 454/146 |
| 6,151,847 A | * | 11/2000 | Okuniewicz et al. | 296/146.15 |
| 6,213,541 B1 | | 4/2001 | Razgunas | 296/192 |

* cited by examiner

Primary Examiner—Jason Morrow
(74) Attorney, Agent, or Firm—Gigiette Bejin

(57) ABSTRACT

A windshield stop is operable in a conventional manner to support the lower edge of an automotive windshield while the adhesive material mounting the windshield to the body of the automobile cures, and is also operable to provide an attachment of the cowl grille assembly covering the gap between the windshield and the hood of the automobile. The windshield stop has a cowl mounting portion integrally formed with the finger supports for the windshield. An opening through the cowl mounting portion can receive a conventional push pin to attach the cowl grille assembly to the windshield stop and provide a fixed support therefore.

17 Claims, 3 Drawing Sheets

WINDSHIELD STOP FOR COWL VENT GRILLE ATTACHMENT

BACKGROUND OF THE INVENTION

A windshield stop, such as is disclosed in U.S. Pat. No. 5,214,824, issued to Hans-Jurgen Lesser, et al on Jun. 1, 1993, is used to support the lower edge of a windshield on an automobile. Such a windshield stop is well known in the automotive industry and is used by multiple manufacturers. The sole function of this disclosed windshield stop is to support the lower edge of the automobile windshield. No other automobile structure is known to be attached to the windshield stop.

In U.S. Pat. No. 4,679,845, issued to Heinz Detampel on Jul. 14, 1987, the windshield is adhesively secured to the body of the automobile with the lower edge of the windshield extending below the adhesive connection. A windshield cowl plate is formed with a groove that receives the lower edge of the windshield and is also mounted to the body structure to hide the engine compartment from view.

In U.S. Pat. No. 5,692,953, issued to Mary Bell on Dec. 2, 1997, and in U.S. Pat. No. 6,213,54.1, issued to Paul S. Razgunas on Apr. 10, 2001, the cowl assembly is depicted as incorporating a screen or grill portion that is connected to the underlying cowl member in a manner to permit limited relative movement therebetween. In Bell, a push pin connects the cowl member and the cowl screen to permit relative movement. In U.S. Pat. No. 5,522,636, issued to Theodore Kolar, Jr. on Jun. 4, 1996, an elastomeric member is pinned to the cowl assembly and engages the lower edge of the windshield. This member is not supportive of the lower edge of the windshield and also does not support any other structural component of the automobile, including the cowl.

In U.S. Pat. No. 4,758,039, issued to Tsuneyoshi Ohhazama on Jul. 19, 1988, and in U.S. Pat. No. 4,304,075, issued to Masakazu Miyoshi on Dec. 8, 1981, a molding holder for engaging the lower edge of an automotive windshield is disclosed. In neither reference is the molding holder used to support a separate automotive component.

Accordingly, it would be desirable to provide an improvement to the windshield stop device presently in known use within the automotive industry to support the lower edge of a windshield to support a separate component, such as the cowling grille.

SUMMARY OF THE INVENTION

It is an object of this invention to overcome the aforementioned disadvantages of the known prior art by providing a windshield stop that has been formed to provide a support for a cowl grille assembly when in position to engage and support the lower edge of the windshield.

It is another object of this invention to improve the known windshield stop with an integral support member that can be used to attach to a cowl grille assembly next to the windshield.

It is a feature of this invention that the windshield stop has a cowl attachment member that will receive a push pin for mounting a cowl grille assembly thereto.

It is an advantage of this invention that packaging constraints of the automobile structure are resolved by designing the windshield stop to provide a mounting point for the cowl vent grille.

It is a further object of this invention to provide a windshield stop member for supporting the lower edge of a windshield and for mounting a cowl assembly on an automobile that is durable in construction, inexpensive of manufacture, carefree of maintenance, facile in assemblage, and simple and effective in use.

These and other objects, features and advantages are accomplished according to the instant invention by providing a windshield stop that is operable in a conventional manner to support the lower edge of an automotive windshield while the adhesive material mounting the windshield to the body of the automobile cures, and is also operable to provide an attachment of the cowl grille assembly covering the gap between the windshield and the hood of the automobile. The windshield stop has a cowl mounting portion integrally formed with the finger supports for the windshield. An opening through the cowl mounting portion can receive a conventional push pin to attach the cowl grille assembly to the windshield stop and provide a fixed support therefore.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
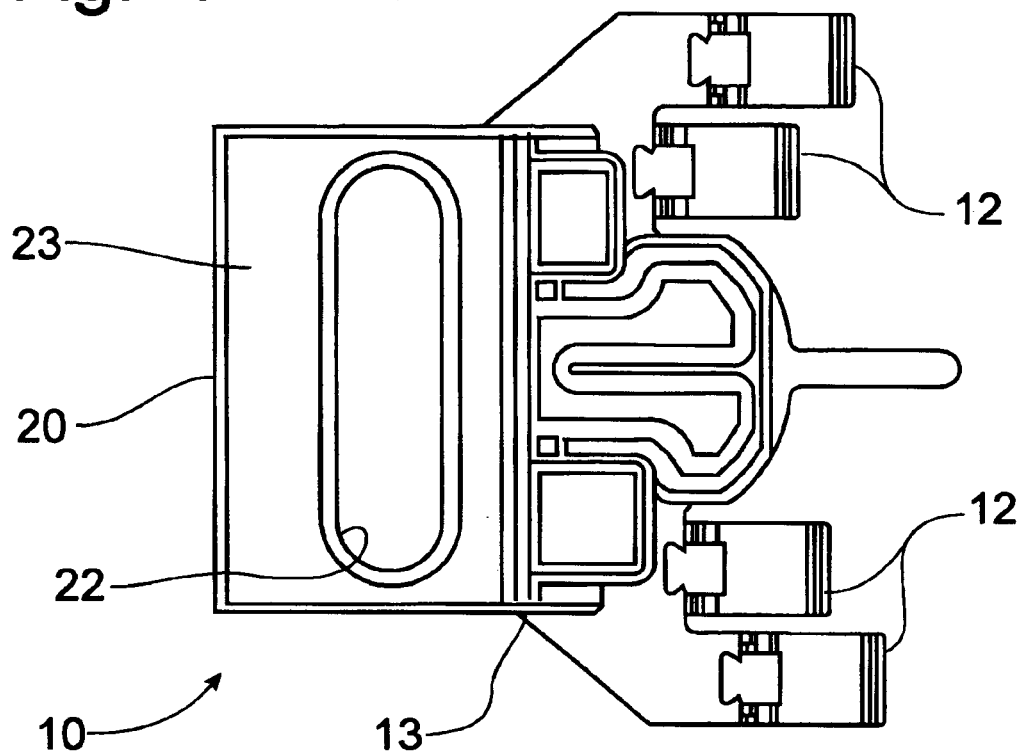
FIG. 1 is a top plan view of the windshield stop incorporating the principles of the instant invention.
Figure 2:
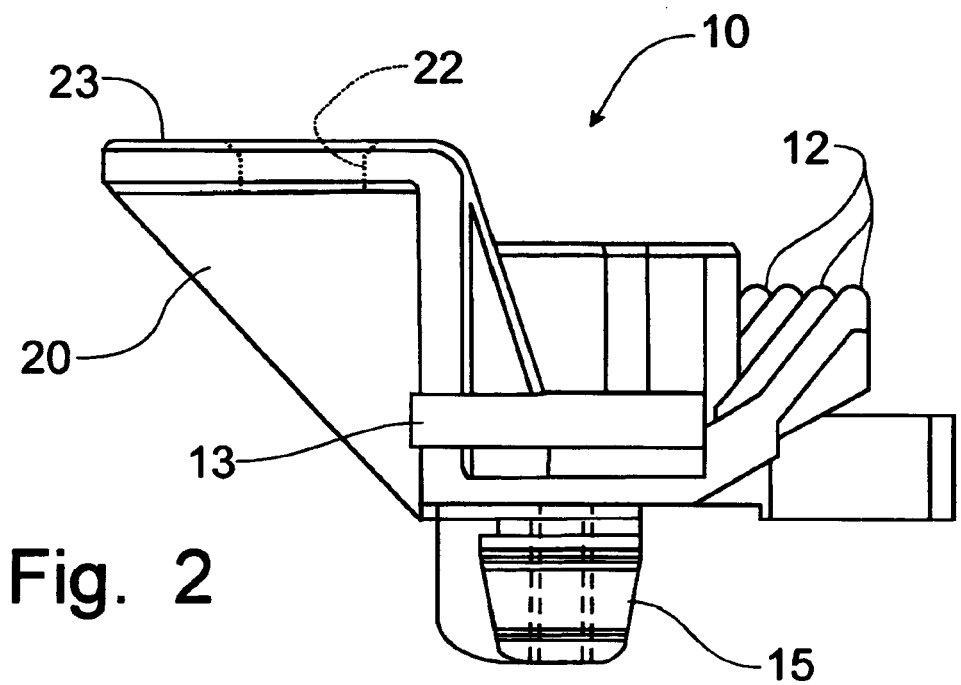
FIG. 2 is a side elevational view of the windshield stop depicted in FIG. 1.
Figure 3:
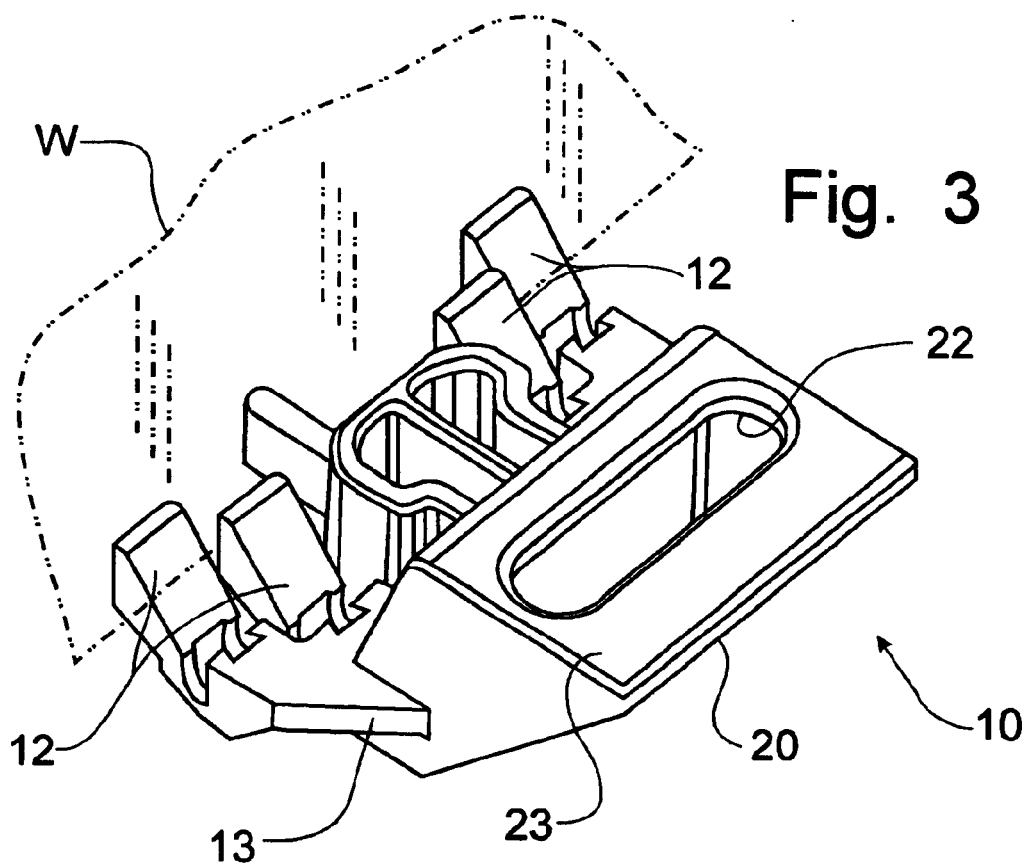
FIG. 3 is a upper perspective view of the windshield stop with a representative portion of a windshield being shown in phantom.
Figure 4:
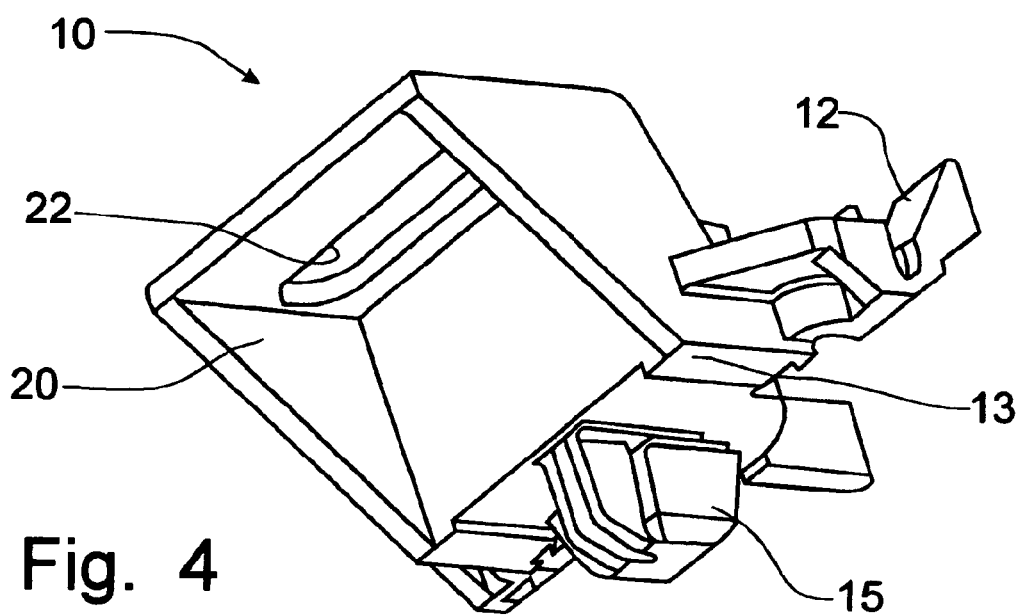
FIG. 4 is a lower perspective view of the windshield stop depicting the underside of the cowl mounting portion.
Figure 5:
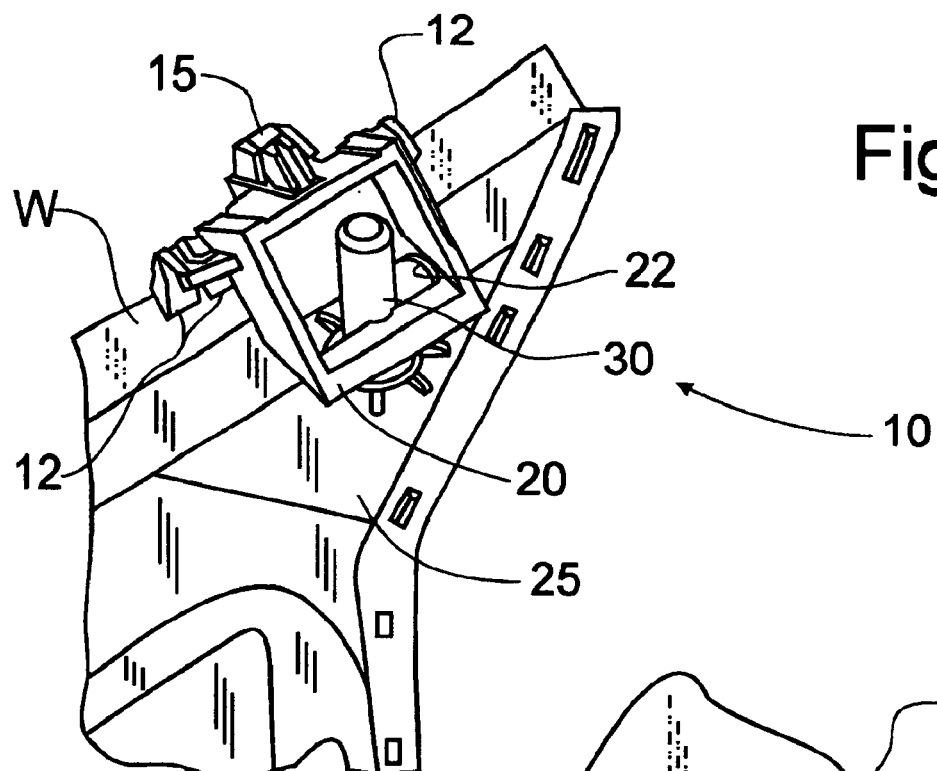
FIG. 5 is a perspective view of the underside of a automobile cowl assembly showing the windshield stop in position supporting the lower edge of the windshield and mounting the cowl assembly, portions of the windshield and cowl grille assembly being broken away for purposes of clarity.
Figure 6:
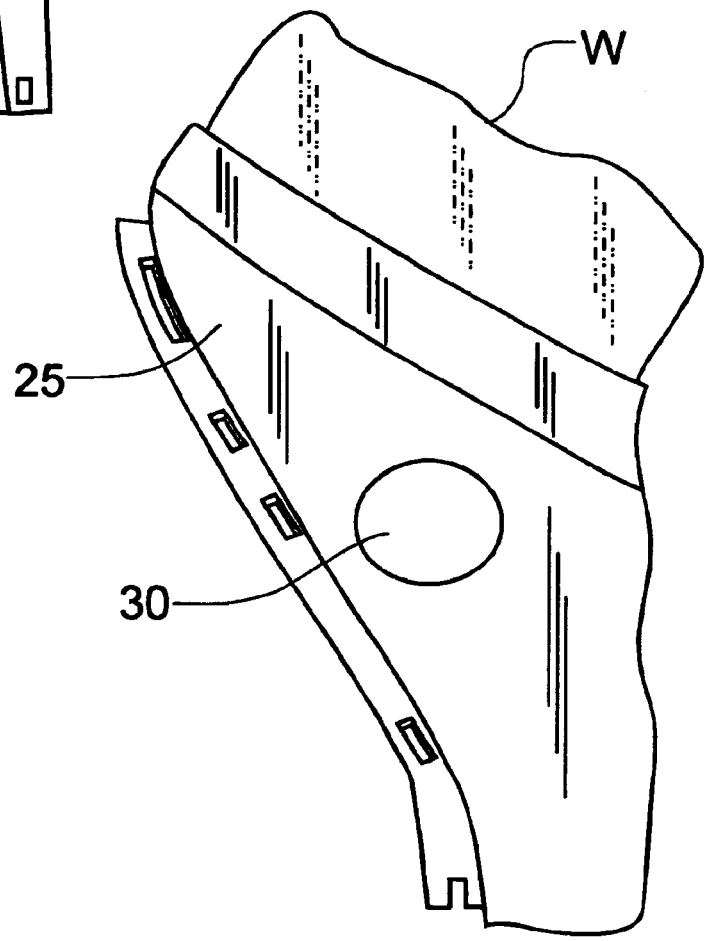
FIG. 6 is a perspective view of the top side of the cowl grille assembly depicted in FIG. 5 mounted to the windshield stop against the windshield.

Referring to FIGS. 1–6, a windshield stop incorporating the principles of the instant invention can best be seen. The windshield stop 10 is of the type described in U.S. Pat. No. 5,214,824, issued to Hans-Jurgen Lesser, et al on Jun. 1, 1993 and incorporates a plurality of fingers 12 projecting outwardly from a base portion 13 to be positionable for supporting the lower edge of the windshield W at a desired orientation while the adhesive (not shown) securing the windshield W to the body of the automobile cures. The windshield stop 10 is also formed with a mounting tab 15 that is insertable into an appropriate opening in the body of the automobile to mount the windshield stop 10 at an appropriate location for supporting the lower edge of the windshield W.

The base portion 13 of the windshield stop 10 is also formed with a rigid cowl mounting bracket member 20 that is oriented to mate with the cowling assembly 25 when the windshield stop 10 is mounted on the body of the automobile. An opening 22 extends transversely along substantially the entire width of the bracket member 20 on the top surface 23 thereof. The opening 22 is sized to receive a conventional push pin 30 to secure the cowling 25 to the windshield stop 10. The top surface 23 is shaped to register with the cowling assembly 25 for a secure attachment of the cowling member 25 on the windshield stop 10. The cowl mounting bracket 20 extends from said base portion 13 in the opposite direction from the extension of said finger members 12 with said mounting tab 15 being located between the finger members 12 and the cowl mounting bracket 20.

Thus, the windshield stop 10 provides a secondary function of providing a mounting support for the cowling C in addition to the primary function of supporting the lower edge of the windshield W. Utilization of the windshield stop 10 for this secondary function eliminates the need for the body or chassis of the automobile to be re-designed to require a mount for the attachment of the cowling 25 and provides a consistent and substantial location for the attachment of the cowling assembly 25. The cowl mounting portion 20 of the windshield stop 10 further provides strength and rigidity for the windshield stop 10 in support of the primary function for the stop 10 in supporting the windshield W.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A windshield stop for supporting an automotive windshield on an automotive chassis comprising:
    a windshield support portion including a plurality of finger members projecting from a base portion that are selectively engageable with a lower edge of said windshield for a positional support thereof; and
    a cowl mounting bracket integrally formed with said base portion to provide structural connection with a cowling member to be mounted adjacent to said windshield.

2. The windshield stop of claim 1 wherein said cowl mounting bracket is formed with a top surface that is positionable when said windshield stop is mounted on said automotive chassis in register with said cowling member.

3. The windshield stop of claim 2 wherein said top surface is formed with an opening therein to receive a fastener connecting said cowling member to said cowl mounting bracket.

4. The windshield stop of claim 3 wherein said fastener is a push pin that engages the sides of said opening for securing said cowling member to said cowl mounting bracket.

5. The windshield stop of claim 3 wherein said cowl mounting bracket extends from said base portion in opposition to said finger members.

6. The windshield stop of claim 5 wherein said base portion is also formed with a mounting tab that is engageable with the automotive chassis for connecting said windshield stop thereto.

7. The windshield stop of claim 6 wherein said mounting tab is positioned intermediate said finger members and said cowl mounting bracket.

8. In an automobile having a chassis, a windshield mounted on said chassis, and a cowling member supported on said chassis adjacent said windshield, said windshield being supported on a windshield stop mounted on said chassis, said windshield stop being formed with finger members projecting outwardly from a base portion engaged with said chassis, the improvement comprising:
    said windshield stop being formed with a cowl mounting bracket integrally formed with said base portion to provide structural connection for said cowling member.

9. The automobile of claim 8 wherein said cowl mounting bracket extends from said base portion in opposition to said finger members.

10. The automobile of claim 9 wherein said cowl mounting bracket is formed with a top surface that is positionable in register with said cowling member.

11. The automobile of claim 10 wherein said top surface is formed with an opening therein to receive a fastener connecting said cowling member to said cowl mounting bracket.

12. The automobile of claim 11 wherein said base portion is also formed with a mounting tab that is engageable with the automotive chassis for connecting said windshield stop thereto.

13. The automobile of claim 12 wherein said mounting tab is positioned intermediate said finger members and said cowl mounting bracket.

14. A method of mounting a cowling member on an automobile chassis adjacent a windshield supported on said chassis comprising the steps of:
    supplying a windshield stop having a plurality of finger members projecting outwardly from a base portion to engage a lower edge of said windshield for support thereof on said chassis, and a cowling mounting bracket integrally formed with said base portion and projecting therefrom oppositely of said finger members;
    mounting said windshield stop on said chassis for support of said windshield; and
    attaching said cowling member to said cowling mounting bracket.

15. The method of claim 14 wherein said attaching step includes the step of inserting a fastener through said cowling member and into an opening formed in said cowling mounting bracket.

16. The method of claim 15 wherein mounting step positions a top surface of said cowling mounting bracket in a location to be in register with said cowling member, said top surface having said opening formed therein for receipt of said fastener.

17. The method of claim 16 wherein said mounting step further includes the step of inserting a mounting tab into said chassis so that forces exerted on said finger members by said windshield is in opposition to forces exerted on said cowling mounting bracket by said attaching step.

* * * * *